United States Patent [19]

Dressel et al.

[11] 4,142,596
[45] Mar. 6, 1979

[54] DRIVE LINK PERMITTING FEED AND ROTATION OF DRILLS OF VARIOUS SIZES

[75] Inventors: Michael O. Dressel, Englewood; Horace M. Varner, Littleton, both of Colo.

[73] Assignee: The Bendix Corporation, Englewood, Colo.

[21] Appl. No.: 831,729

[22] Filed: Sep. 9, 1977

[51] Int. Cl.$^2$ ............................ E21C 1/02; E21C 5/02
[52] U.S. Cl. .................................... 175/113; 226/172; 226/173; 414/431; 74/245 C
[58] Field of Search .................... 175/113; 299/82, 83, 299/84; 74/245 C, 250 R, 250 C, 250 S; 173/145, 147, 149; 64/23.5, 23.6, 23.7; 226/168, 170–173; 214/338, 339

[56] References Cited

U.S. PATENT DOCUMENTS

| 783,032 | 2/1905 | Foote | 74/829 |
|---|---|---|---|
| 1,960,719 | 5/1934 | Stibbs | 74/245 C |
| 2,201,673 | 5/1940 | Park | 64/23.7 |
| 3,711,161 | 1/1973 | Proctor | 299/82 |
| 3,724,567 | 4/1973 | Smitherman | 166/77 X |

*Primary Examiner*—Ernest R. Purser
*Assistant Examiner*—Nick A. Nichols, Jr.
*Attorney, Agent, or Firm*—Robert C. Smith; William F. Thornton

[57] ABSTRACT

A special drive link permits drilling of holes of different diameters with the same drill drive. The drill shaft has a helical pattern of scroll-like projections for removal of cuttings. The drill drive mechanism includes sprockets carrying two chains of drive links which mate with the helical scroll projections to move the drill shaft axially, and projections on the drive links mate together at the center to hold the drive links tightly around the drill shaft. The drill shaft is formed with an elongated axial groove separating the helical projections and defining notch surfaces which mate with projections or tangs extending inwardly from the hollow portion of the drive links where they surround the drill shaft. Rotation of the mechanism results in transferring the rotating force through the sides of the inwardly extending projection of the drive links to the corresponding notch surfaces of the scroll projections. The drive link is configured to accept some maximum diameter of the scroll projections having a specific cross-section. Assuming a smaller drill shaft diameter, the diameter of the scroll projections may be reduced substantially, and it will still be possible for the helical projections to enter the depressions on the links a sufficient amount to provide adequate bearing surface and for the inwardly extending tang to reach sufficient area on the corresponding scroll notch surfaces to provide a positive rotational drive.

6 Claims, 7 Drawing Figures

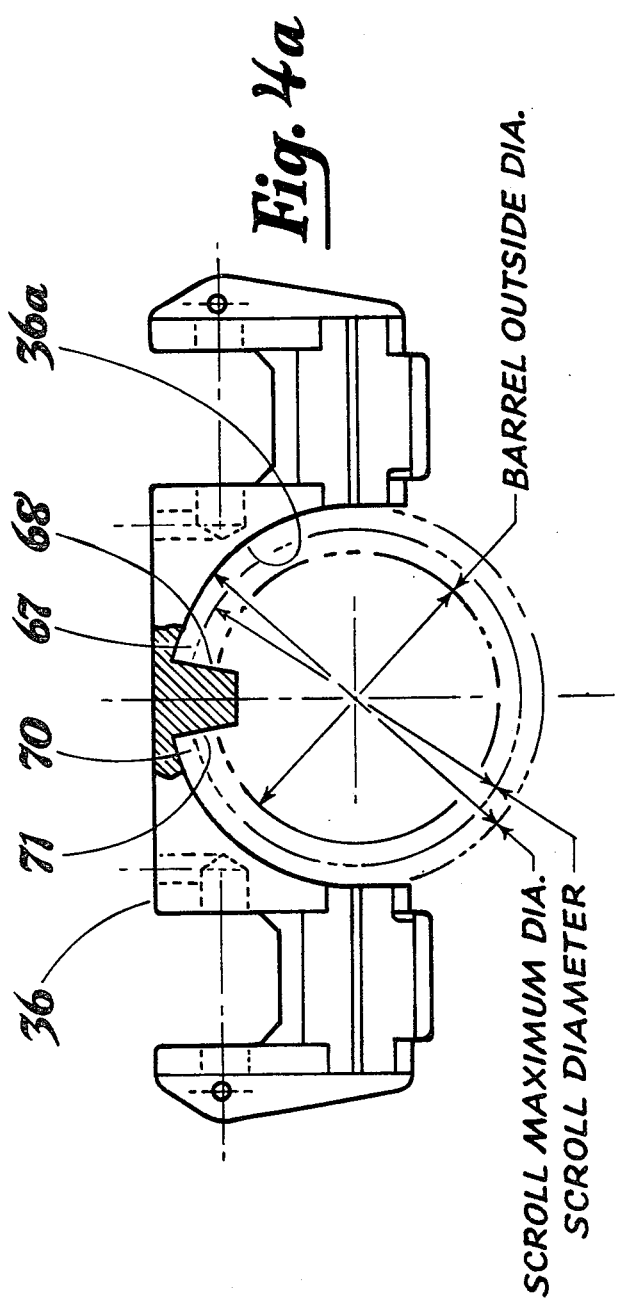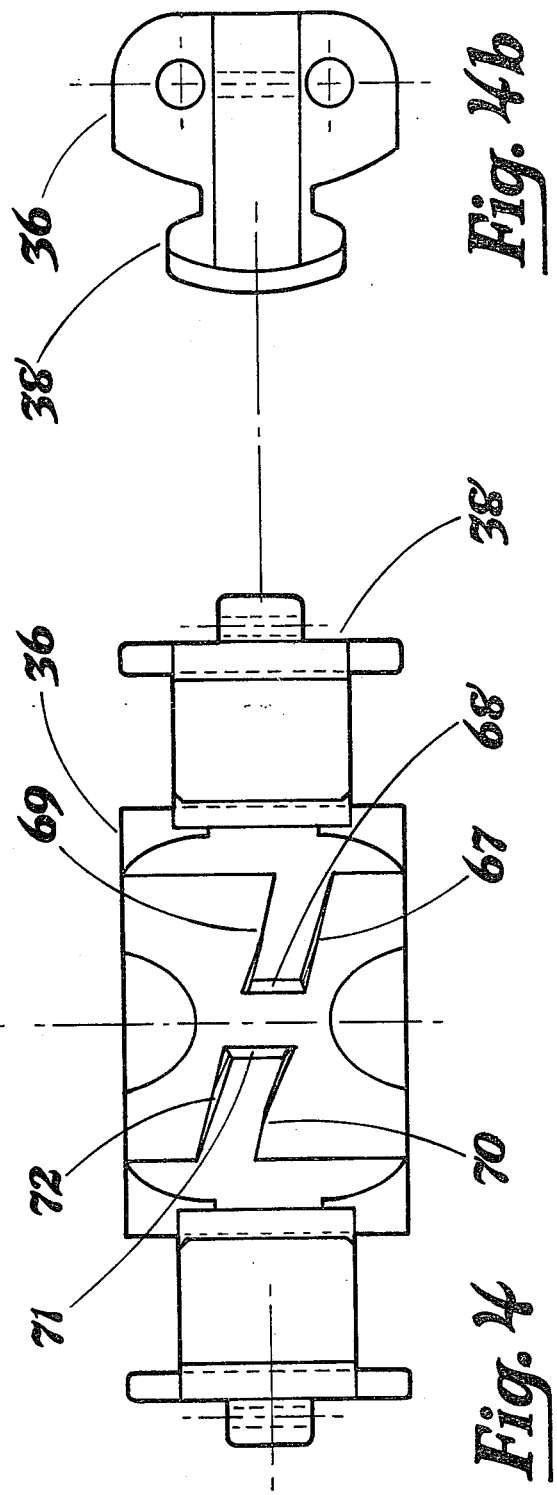

DRIVE LINK PERMITTING FEED AND ROTATION OF DRILLS OF VARIOUS SIZES

BACKGROUND OF THE INVENTION

The drilling of holes in rock for placement of support bolts or for other purposes has in the past generally involved drilling holes of only a single diameter. Recently in connection with the art of fastening support bolts to the roofs of mines it has become necessary to drill different diameter holes in close proximity. For example, conditions could warrent the use of one-inch diameter holes for three-quarter inch rebar bolts epoxy-anchored and $1\frac{3}{8}''$ diameter holes for expansion-anchored bolts. Present drilling technology requires changing both the drill and the drive when hole size is changed, a time-consuming and expensive procedure. There has, therefore, been a need for a drilling system which would allow changing hole size simply by changing the drill and bit without also requiring change of the entire drill drive mechanism.

DESCRIPTION OF THE DRAWINGS

FIG. 4 is a plan view of a drill drive link in accordance with the present invention;

FIG. 4a is a top view, partly in section, of the drill drive link of FIG. 4;

FIG. 4b is a side view of the drill drive link of FIG. 4; and

DESCRIPTION OF THE PREFERRED EMBODIMENT

Figure 1:
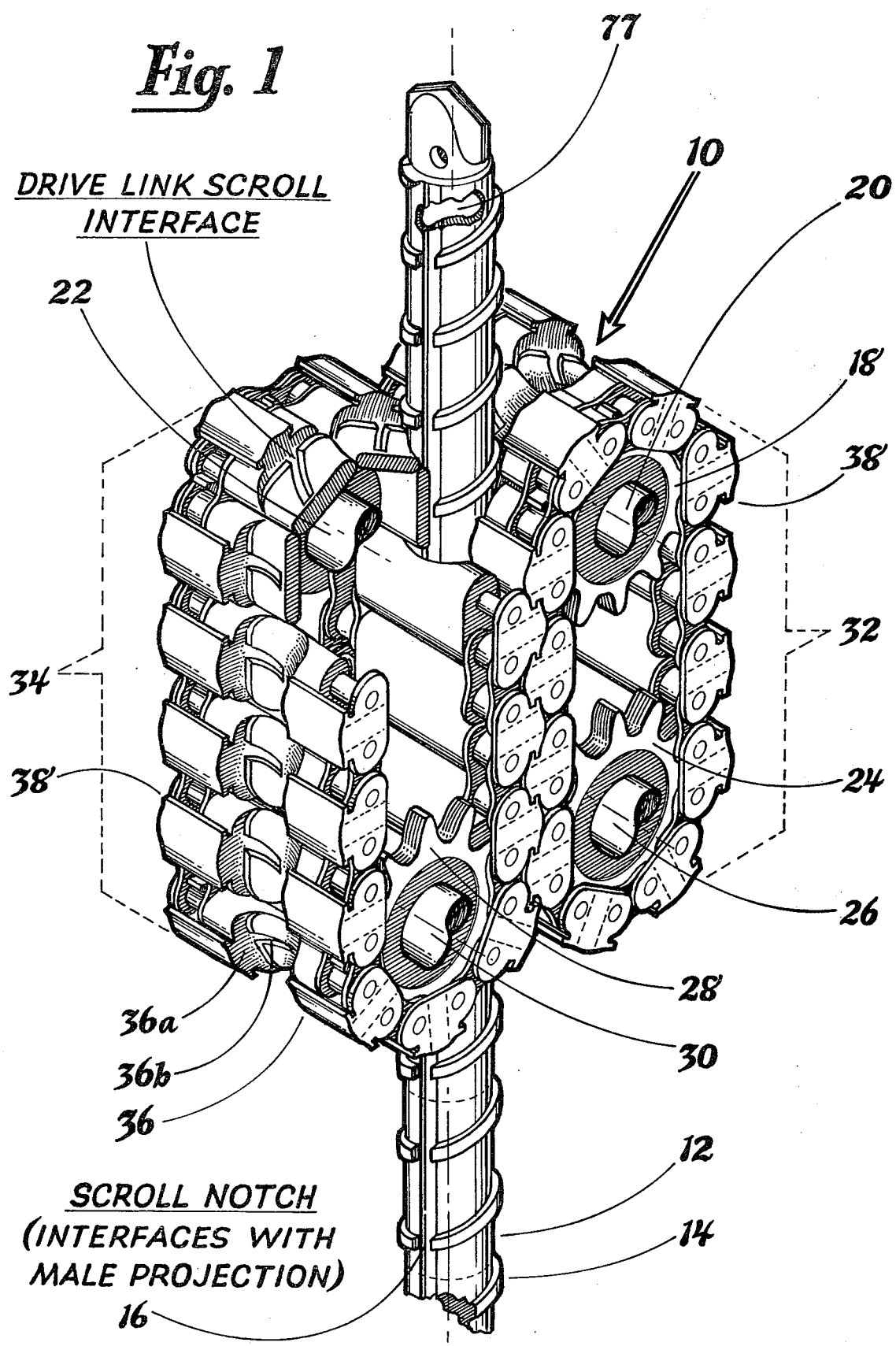
FIG. 1 is a perspective view, shown partly broken away, of a portion of the drill drive mechanism for which the present invention is an improvement.

FIG. 1 is a perspective view, shown partially broken away for clarity, of the portion of my drill drive mechanism, shown generally at numeral 10, whose function is to provide axial drive of the drill shaft 12. It will be observed that shaft 12 incorporates a series of generally helical scroll-like projections 14 separated by an elongated axial groove defining notches 16 which are axially aligned as the shaft 12 passes through the drive mechanism 10. The shaft 12 may be articulated to facilitate bending when not under load. The drive mechanism includes two pairs of drive sprockets which are driven by means external to the assembly of FIG. 1, of which one such sprocket is shown at numeral 18 carried on a drive shaft 20. A similar sprocket is carried on a drive shaft 22 which is shown broken away to show other parts of the structure. Two additional drive sprockets (not shown) are located at the opposite ends of shafts 20 and 22. A set of four idler sprockets are also included, including sprocket 24 on a shaft 26 and sprocket 28 on a shaft 30. As with the drive sprockets, an additional pair of idler sprockets are carried at the opposite ends of shafts 26 and 30.

Carried on the above described sprockets are a pair of roller chains 32 and 34, each of which includes a plurality of drive links 36 including projections 38 arranged to interlink at the center with the links surrounding the drill shaft 12. Each of the drive links 36 is formed with a hollow center section 36a which is adapted to wrap around one half (approximately) of the diameter of the shaft 12. This hollow section includes a pair of internal grooves 36b which mate with the helical scroll projections 14 when the links are interlocked at the center around the shaft 12. Thus, rotation of the drive shafts 20 and 22 results in causing the several grooves 36b to pick up and carry corresponding scroll projections 14, thereby moving drive shaft 12 upward or downward depending upon the direction of rotation of the drive shafts. With several grooves contacting several of the scroll projections 14 at all times, excessive loading on any single groove or projection is avoided.

Figure 2:
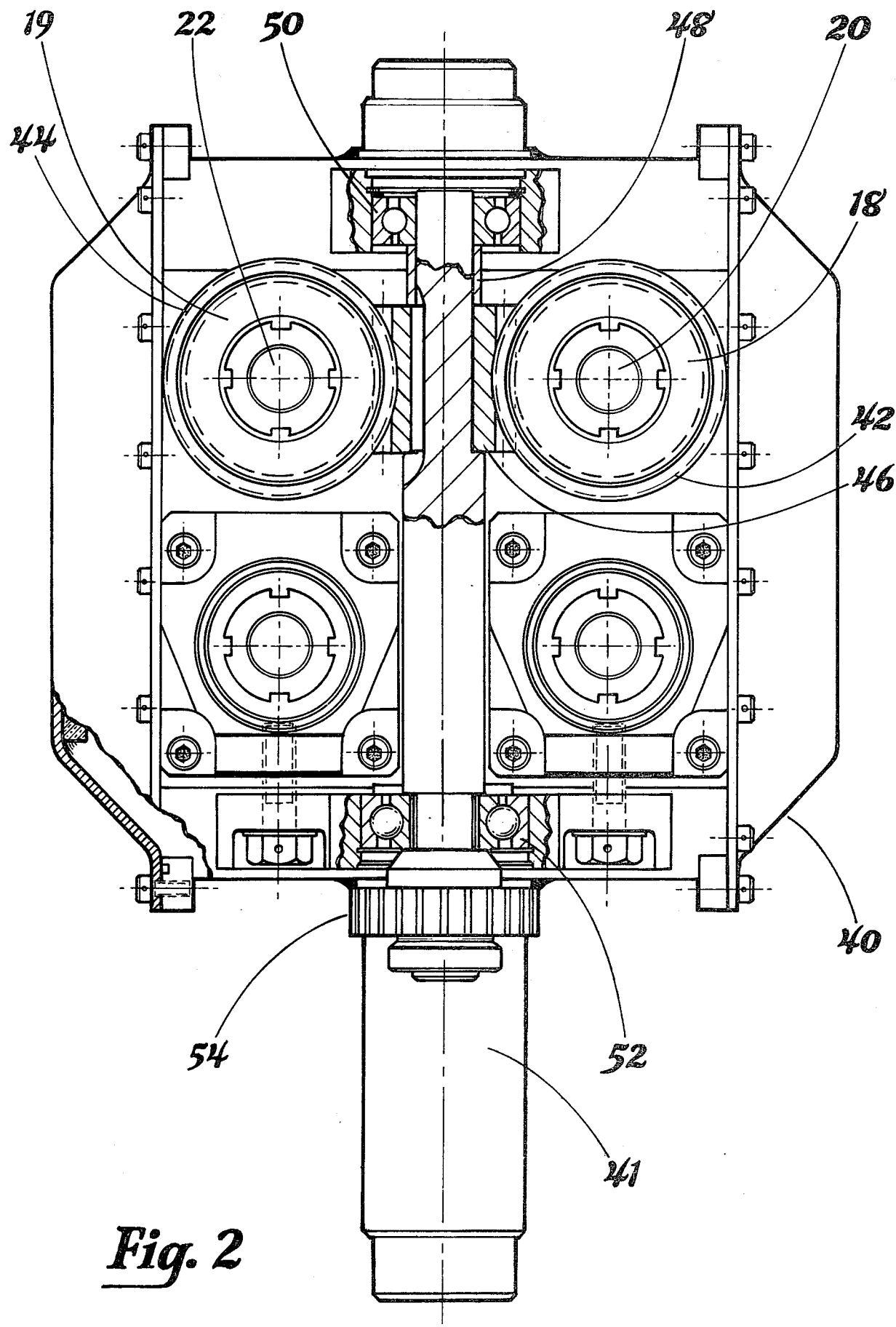
FIG. 2 is a side view, partly in section, showing a portion of the drill drive mechanism of FIG. 1 not visible therein.

The entire drive mechanism 10 is carried in a housing 40 supported on a rotatable shaft 41 shown in FIG. 2 which is part of a larger support and drive structure, not shown. FIG. 2 is drawn partly in section and with part of the bearing caps and worm gear removed to show that worm shaft 48 is continuous. Drive sprockets 18 and 19 appear in phantom since they are behind a pair of drive gears 42 and 44 carried on shafts 20 and 22, respectively. Gears 42 and 44 are meshed with a worm gear 46 carried on a shaft 48 which is supported in bearings 50 and 52 in housing 40. Shaft 48 is driven by a gear 54 on its lower end which is, in turn, driven by a gear drive system connected to shaft 41 which rotates the entire housing 40 for rotational drive of drill shaft 12 as well as driving shaft 48 to provide axial feed of shaft 12.

Figure 5:
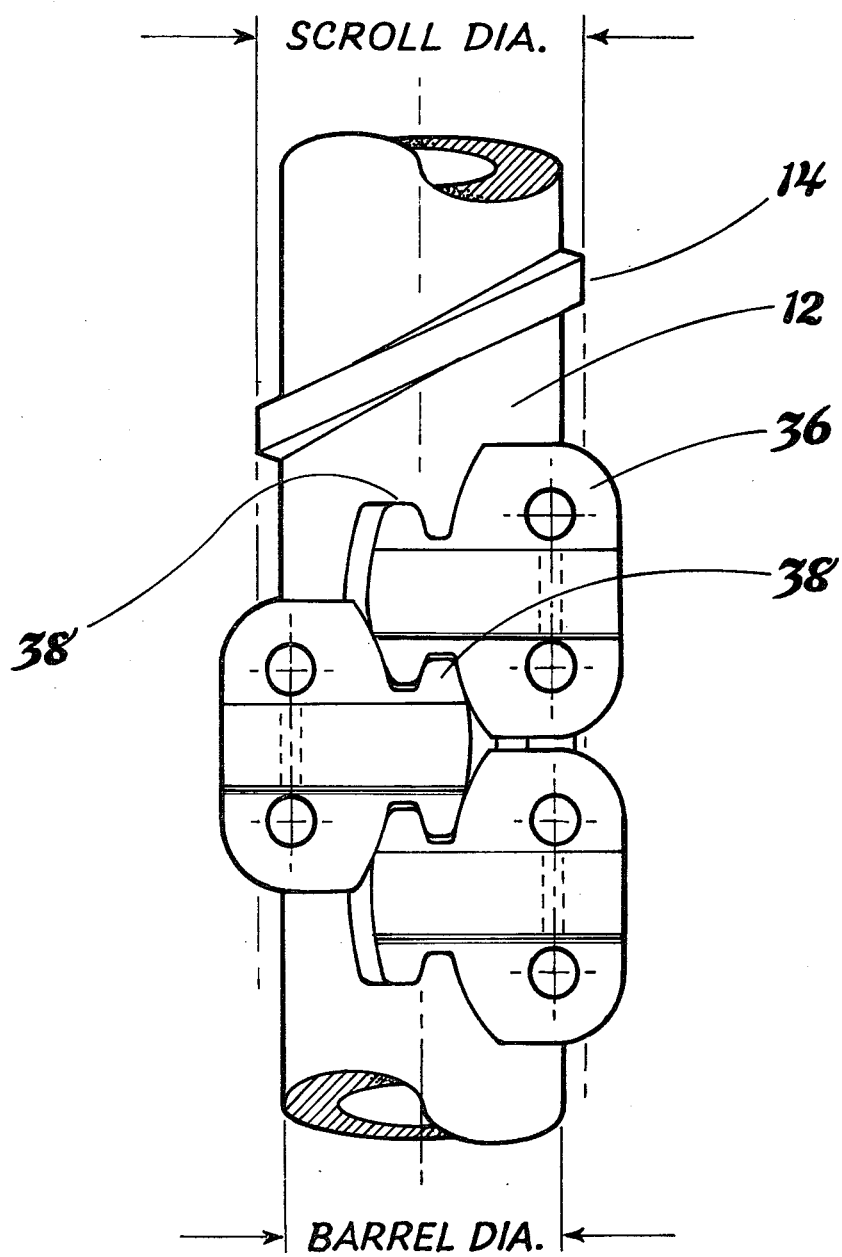
FIG. 5 is a plan view of a plurality of meshed drive links surrounding a drill shaft.

With the above described drill drive mechanism in mind, the concept and operation of the present invention can best be illustrated with reference to FIGS. 3, 4, 4a, 4b and 5, which show respectively the drill configuration, the drive link (various views) and the relationship of the meshed drive links to the drill. When meshed and interlocked as shown in FIG. 5, the drive links 36 envelop the drill 12 and scroll projections 14 as generally described above, with the helix contours defined by the surfaces 61, 62, 63 and 64, 65, 66 fitting into the drive link depressions 36b defined by the surfaces 67, 68, 69 and 70, 71, 72, respectively (see FIGS. 3 and 4). As described above, the drill is rotated by turning the entire assembly including the meshed drive links about the drill axis with the torque transmitted by contact of the drive link surfaces 68 or 71 to the notch surfaces 62 or 65 of the scroll projections 14 depending on the direction of rotation. Thrust is provided by moving the meshed links vertically with the force transmitted by the contact of drive link surfaces 67 and 70 or 69 and 72 to the helix surfaces 61 and 64 or 63 and 66, depending upon thrust direction.

Figure 3:
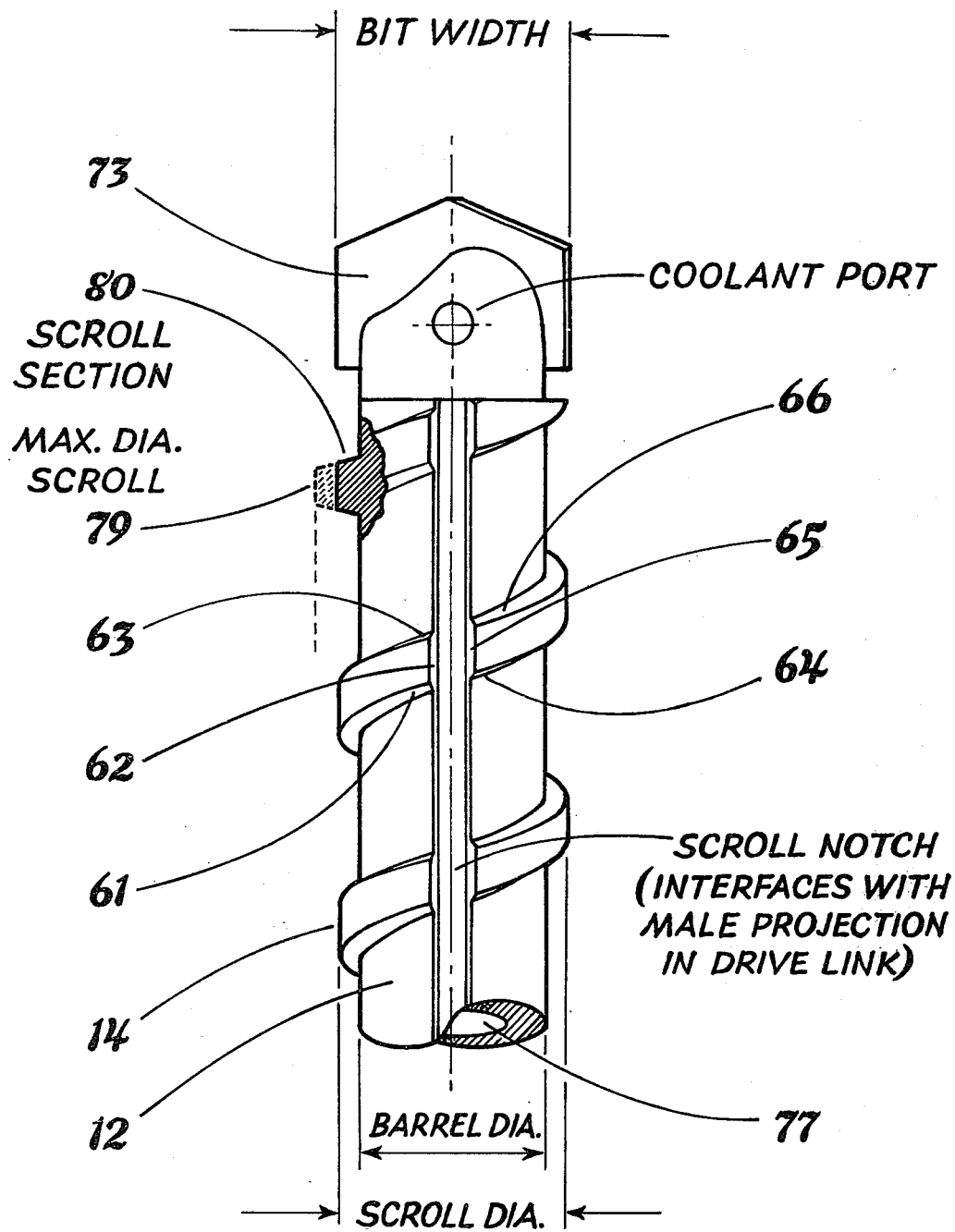
FIG. 3 is a plan view, partly in section, of the drill shaft used in connection with the present invention.

Referring to the drill geometry, FIG. 3, the width of bit 73 determines the diameter of the drilled holes. The diameter of the cuttings removal helix 14 is somewhat smaller than the bit width 73 to minimize friction due to contact with the side of the hole. The diameter of the shaft 12 may be selected more arbitrarily, the requirements being sufficient volume between the turns of the scroll projections to remove the cuttings and sufficient material in the barrel to transmit the desired torque to the bit, recognizing the depth of the axial groove which may provide part of load-bearing surfaces 62 and 65. It is also required, of course, that the coolant passage 77 on the interior of shaft 12 be of sufficient size to pass the required coolant flow.

To accommodate various diameters of drills, the drive link (FIG. 4) is configured to accept some maximum diameter of the helical projection 14 with a specific cross-section 79 (see FIG. 3). Since forces and torques are transmitted to the drill only through some of the lateral surfaces 67, 68, 69, 70, 71 and 72, the link can also drive drills having smaller diameter scroll projections 80 which may be obtained by truncating the maximum section 79 as shown in FIG. 3. The smaller scroll diameter thus allows smaller bit widths and thus smaller diameter holes. The minimum size that can be driven is a function of the bearing areas available on the truncated scroll projections, the number of links in contact with the helix, and the torques and forces that must be transmitted. Thus, with the helix configuration coordinated with the link contours, a range of diameters of the helical projections, and thus bit widths, may be driven by the same drive mechanism requiring only a change in the drill to change the hole size and obviating the need for changeout of any portion of the drive mechanism. As stated above, the drill shaft diameters may vary considerably even relative to the depths of the helical projections. The helical projections are shown as having a generally trapezoidal cross-section, it being preferable that they are thicker at the root where they join the drill shaft than at their periphery. This shape, being like a gear rack, also aids in meshing with the drive links. If a smaller diameter drill is made by using a smaller diameter shaft, the helical projections are preferably made of sufficient thickness at the root that they have essentially the same thickness at the edge of the drive link groove as if they were of the maximum diameter which the link could accommodate. It is obvious, of course, that the drill drive will still operate with helical projections of lesser thickness, although this results in a degree of lost motion when the drive is reversed and some additional susceptibility to wear.

I claim:

1. In a drill and drill drive mechanism wherein said drill comprises a drill bit, a shaft with a plurality of helically arranged scroll projections on said shaft and a notch cut axially along the side of said shaft to expose notches between said helical scroll projections, said drill drive comprises a plurality of sprockets and a pair of chains carried on and driven by said sprockets, said chains being formed of drive links and conventional intermediate links connecting said drive links, said drive links having concave contact surfaces with tangs extending therefrom mating with said notches between said helical scroll projections, grooves for receiving said helical scroll projections, and linking projections on the outside edges thereof which mate with linking projections on drive links carried on the opposite of said two chains to hold said drive links tightly around and in mesh with said drive shaft;

means permitting driving of drill shafts having helical scroll projections between a selected maximum diameter and a selected minimum diameter comprising drive links wherein the contour of said concave surface and the grooves thereon are configured to accept a drill shaft having helical scroll projections of said maximum desired diameter, said tangs are of sufficient length to make substantial contact on the scroll notches of a drill shaft having scroll projections of said minimum diameter, said grooves are of such width that they will receive scroll projections of said maximum desired diameter and those of said minimum diameter, and wherein said axial notch is cut sufficiently deep on any drill shaft used to accommodate the length of said tang.

2. A drill and drill drive mechanism as set forth in claim 1 wherein said helical scroll projection is widest at its base and tapers toward its outside edge, and drill shafts of smaller diameter than said maximum diameter have helical scroll projections whose thickness at the nearest contact with said grooves is essentially the same as the thickness of helical scroll projections of maximum diameter at their nearest contact with said grooves.

3. In a drill and drill drive mechanism wherein said drill comprises a drill bit, a shaft with a plurality of helically arranged scroll projections on said shaft and a notch cut axially along the side of said shaft to expose notches between said helical scroll projections, said drill drive comprises a plurality of sprockets and a pair of chains carried on and driven by said sprockets, said chains being formed of drive links and conventional intermediate links connecting said drive links, said drive links having concave contact surfaces with tangs extending therefrom mating with said notches between said helical scroll projections, grooves for receiving said helical scroll projections, and linking projections on the outside edges thereof which mate with linking projections on drive links carried on the opposite of said two chains to hold said drive links tightly around and in mesh with said drive shaft;

wherein said drive links and drill shaft are configured such that said drive links will mate with and drive drill shafts of sizes between a maximum diameter and a minimun diameter, said tangs being of sufficient length to make substantial contact on the scroll notches of a drill shaft having helical scroll projections of said minimum diameter, the axial notch on drill shafts of all said sizes being sufficiently deep to accept said tangs, and said grooves being of such width that they will receive helical projections of said maximum diameter and will also receive and provide adequate contact surface for helical projections of said minimum diameter.

4. A drill and drill drive mechanism as set forth in claim 3 wherein said helical scroll projection is widest at its base and tapers toward its outside edge, and drill shafts of smaller diameter than said maximum diameter have helical scroll projections whose thickness at the nearest contact with said grooves is essentially the same as the thickness of helical scroll projections of maximum diameter at their nearest contact with said grooves.

5. A drill and drill drive mechanism as set forth in claim 3 wherein the maximum diameter of said helical scroll projections is slightly less than the diameter of the circle of revolution of said bit.

6. A drill shaft and drill drive mechanism as set forth in claim 3 wherein the diameters of said drill shaft and said helical scroll projections and the space between adjacent helical scroll projections are chosen to assure adequate volume for removal of cuttings.

* * * * *